United States Patent [19]
Mehta et al.

[11] Patent Number: 5,977,521
[45] Date of Patent: *Nov. 2, 1999

[54] UNIVERSAL ELECTRIC CHAFER HEATER

[75] Inventors: Anil N. Mehta, Glendale; Ralph M. Francis, Jr., Racine, both of Wis.

[73] Assignee: The Vollrath Company, L.L.C., Sheboygan, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/825,358

[22] Filed: Mar. 28, 1997

[51] Int. Cl.⁶ ..................................................... F27D 11/00
[52] U.S. Cl. ................................................................ 219/436
[58] Field of Search ..................................... 219/436, 433, 219/218; 126/43, 39, 377; 426/233

[56] References Cited

U.S. PATENT DOCUMENTS

| | | | |
|---|---|---|---|
| 2,548,932 | 4/1951 | Ball | 219/19 |
| 3,249,737 | 5/1966 | Casebeer . | |
| 3,361,126 | 1/1968 | Bloomfield | 126/261 |
| 3,489,880 | 1/1970 | Bloomfield et al. . | |
| 3,648,659 | 3/1972 | Jones | 119/1 |
| 4,000,243 | 12/1976 | Curren | 264/293 |
| 4,072,091 | 2/1978 | Richardson . | |
| 4,164,644 | 8/1979 | Remsnyder | 219/433 |
| 4,164,645 | 8/1979 | Dogliotti | 219/452 |
| 4,725,225 | 2/1988 | Gravitt | 431/320 |
| 4,726,288 | 2/1988 | Lansing | 99/330 |
| 4,899,722 | 2/1990 | Horewitch | 126/39 |
| 4,996,410 | 2/1991 | Ho | 219/432 |
| 5,012,791 | 5/1991 | McCabe | 126/43 |
| 5,045,672 | 9/1991 | Scott . | |
| 5,119,800 | 6/1992 | Roberts et al. | 126/377 |
| 5,211,157 | 5/1993 | Schwartz et al. | 126/39 |
| 5,290,997 | 3/1994 | Lai et al. | 219/218 |
| 5,453,596 | 9/1995 | Verveniotis | 219/433 |
| 5,555,732 | 9/1996 | Whiticar | 62/3.4 |
| 5,567,458 | 10/1996 | Wu | 426/233 |

FOREIGN PATENT DOCUMENTS

| | | |
|---|---|---|
| 0428230 A1 | 5/1991 | European Pat. Off. . |
| 0696430 A1 | 2/1996 | European Pat. Off. . |
| 3004105 A1 | 8/1981 | Germany . |

OTHER PUBLICATIONS

*Sanyo*—Japanese article believed to be relevant.
Figure 1—Assembly of Electrically Heated Water Pan Vollrath Models 99750, 99760 (Used with Vollrath Chafers–Models 99500, 99510 and 99520.
*Host Products*—Electric Heating Unit by Host Products; 1991.
Exerpt from Vollrath Catalog; *From an intimate catered dinner party*.
*Electrical Chafing Warmer*— Japanese article.

*Primary Examiner*—Teresa Walberg
*Assistant Examiner*—Daniel L. Robinson
*Attorney, Agent, or Firm*—Foley & Lardner

[57] ABSTRACT

An electric chafer heater for a chafer is disclosed herein. The chafer heater is removably supported by a shelf disposed below a chafing dish. The chafer heater includes a base having a cylindrical bottom portion held within an aperture in the shelf sized for receiving a standard can heater. The chafer heater further includes a resilient member extending upward from the base, and an electric heating assembly coupled to the resilient member opposite the base. The heating assembly has a heating surface positionable above the base by the compression of the resilient member. The heating surface is biased against the chafing dish when the base is supported by the shelf to provide a thermal interface to transfer heat between the heating surface and the chafing dish. The heating assembly has variable (e.g., low and high) power settings selected by an input device (e.g., a switch). The heater includes a ballast at the bottom of the base, and a switch which cuts off the flow of electricity to the heating assembly in response to a sensed parameter (e.g., temperature; inclination). A visual indicator may provide an indication when the heating surface exceeds a predetermined temperature.

19 Claims, 4 Drawing Sheets

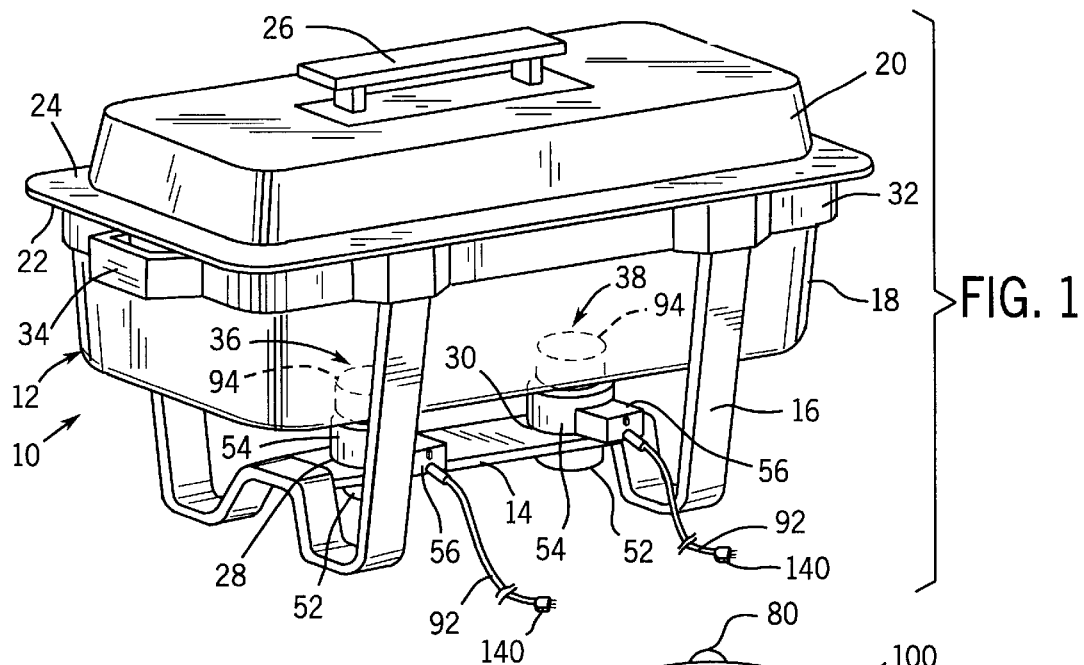
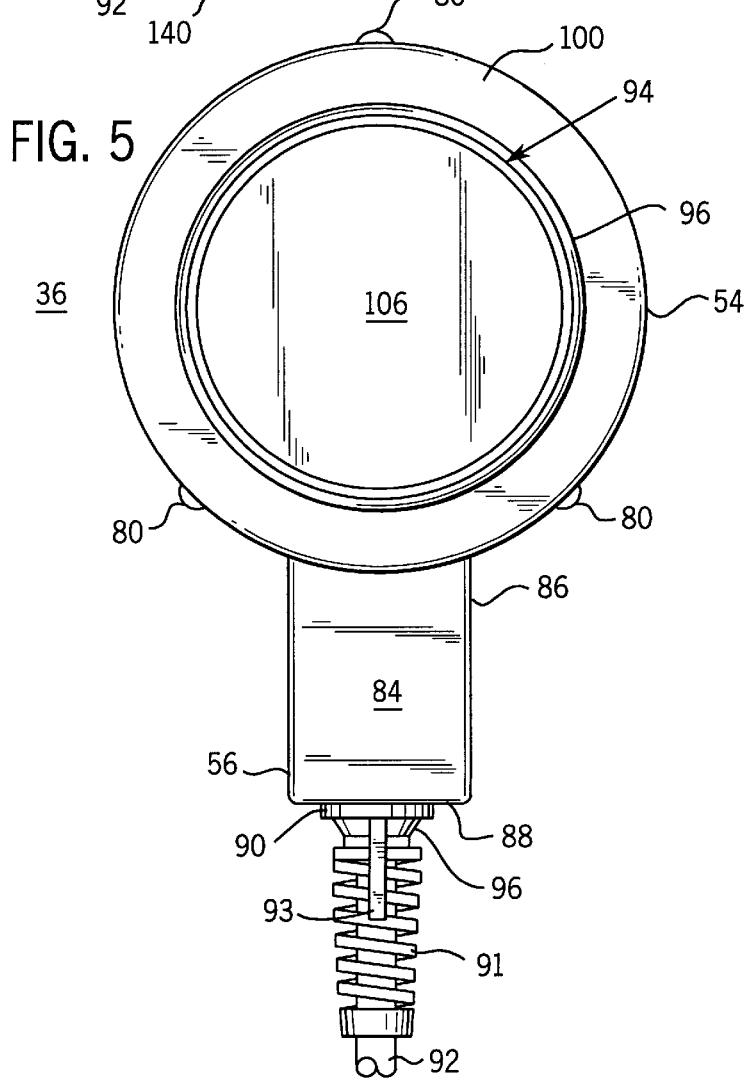

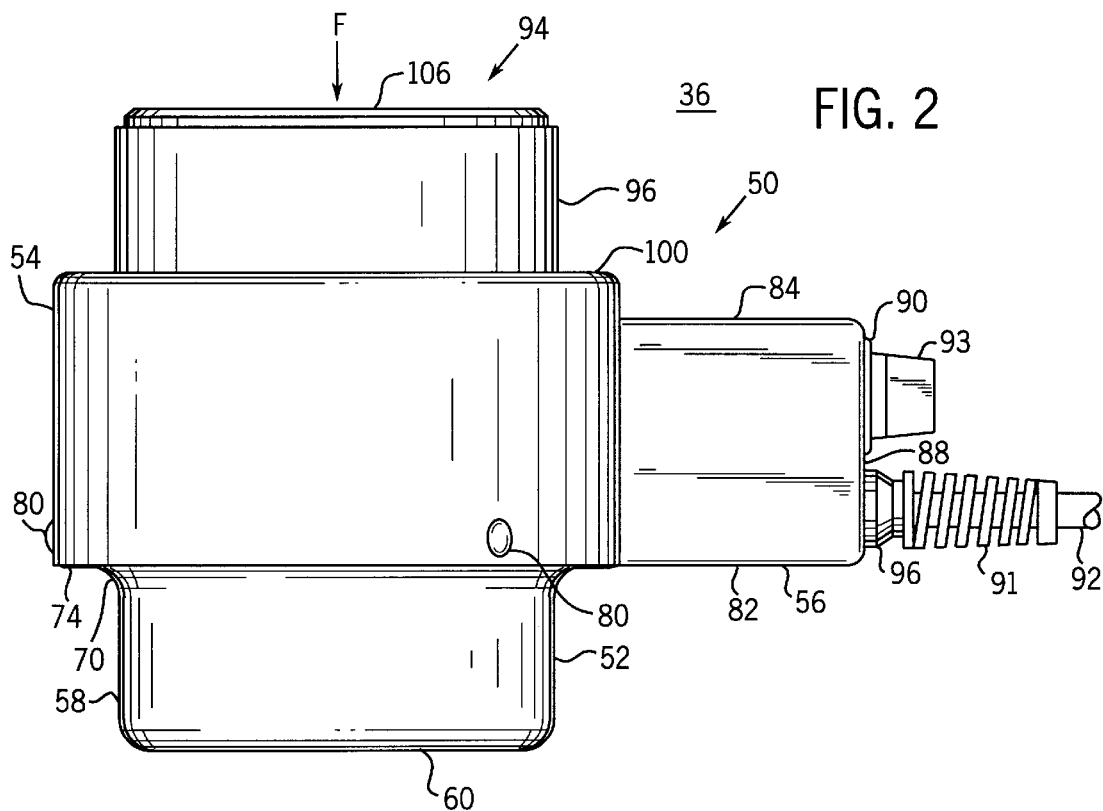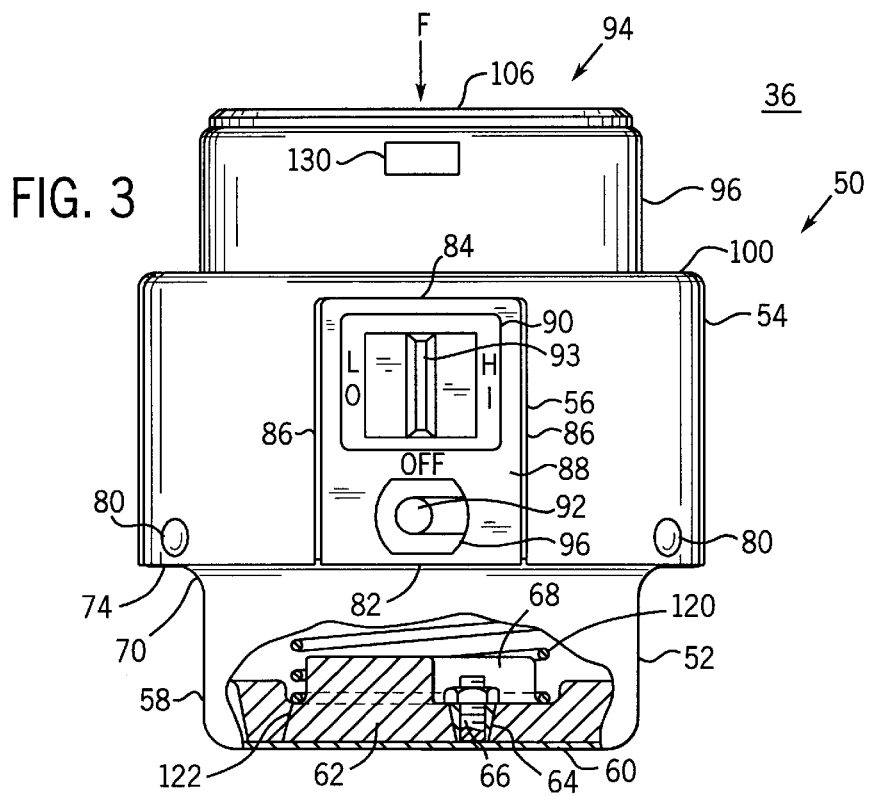

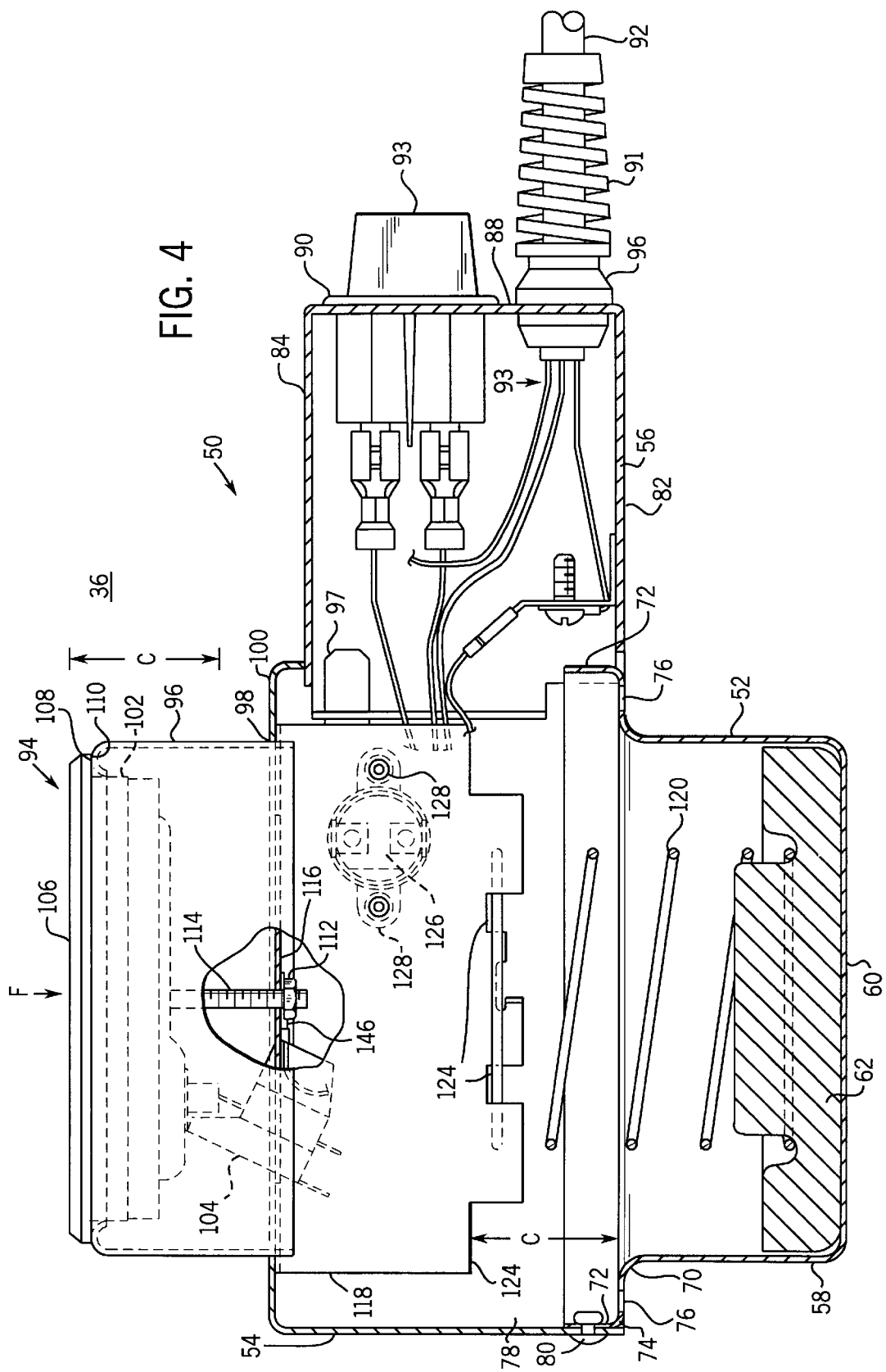

UNIVERSAL ELECTRIC CHAFER HEATER

FIELD OF THE INVENTION

The present invention relates generally to chafer heaters. In particular, the present invention relates to an electric chafer heater including an electric heating assembly positionable above a base by a resilient member such as a spring, wherein the heating assembly has a heating surface biased by the resilient member against the chafing dish of a chafer when the base is supported by a shelf disposed below the chafing dish.

BACKGROUND OF THE INVENTION

A chafer is a portable food or beverage warmer or heater which includes a chafing dish for holding foods or beverages and a shelf disposed below the chafing dish for supporting at least one heater for warming the foods or beverages. Chafers are used to provide food service in restaurants, dining rooms, hotels, institutions and the like, and are often used to provide buffet service. Different types of chafing dishes exist, such as food trays, water pans, coffee urns and soup servers. A full line of chafers is made, for example, by the Vollrath Company of Wisconsin.

Chafers typically require one or two chafer heaters, depending upon the capacity of the chafing dish. Chafer heaters are typically metal canisters (i.e., cans) filled with a flammable chemical fuel. A standard can heater of this type is the "STERNO" can heater, with a diameter of approximately 3.5 inches. Accordingly, chafers typically include a shelf configured to support one or two standard can heaters such that heat from the burning chemical fuel is directed onto the bottom of a chafing dish. The shelf often has an aperture (e.g., a hole or recess) sized for receiving a standard can heater. The shelf and chafing dish are separated by a leg assembly to provide clearance for the can heater and the flames. Many chafers designed to accept chafer heaters of the type described above have been manufactured and sold.

Flammable fuel chafer heaters, however, suffer from a number of drawbacks such as being relatively expensive and having poor temperature control. Flammable fuel chafer heaters also emit relatively high levels of smoke, pollution and odor, especially when used indoors, and are inconvenient to use because of the difficulty in determining when the fuel will burn out.

Several attempts have been made to provide chafer heaters without the above-listed drawbacks. For example, one portable food warming device includes a gas burner assembly and a control box for controlling the supply of gas from a fuel cartridge to the gas burner. This device, however, does not adequately solve the above-listed problems and, in addition, is relatively bulky and inconvenient.

For another example, some chafers are equipped with electric resistance heaters integral to the chafing dish. For example, The Vollrath Company manufactures electric chafers having integral electric heaters for use in areas where fuel cans are not allowed or desired. The electric heaters provide an efficient and reliable source of heat without the odor, smoke and pollution problems associated with flammable-fuel chafer heaters. However, electric heaters integrally attached to chafing dishes cannot be used by chafers designed to use can heaters.

The Electric Heating Unit made by Host Products of California can be used as a heat source by some chafers. Many chafers, however, cannot use the Host Products unit since its cylindrical body has a diameter different than that of a standard can heater and, thus, the unit will not fit within apertures sized to receive standard can heaters. Further, the heat from the Host Products unit is difficult to control since it has only a single power setting (i.e., on/off). In addition, the Host Products unit does not include ballast weight to lower the center of gravity and provide a stable heat source. Other electric heaters, similar to the Host Products unit such as the Yukima model CW-240, the Sanyo model RNW-300, and another heating unit believed to be made in Japan, are also not configured to be received within apertures sized for standard can heaters, have only a single power setting, and do not include a ballast.

Accordingly, it would be advantageous to provide an improved chafer heater which uses an electrical heating assembly. It would further be advantageous to provide an electric chafer heater having variable power settings such as low and high-power settings. It would also be advantageous to provide a universal electric chafer heater configured for use by a high percentage of chafers. It would also be advantageous to provide an electric chafer heater with a ballast for increased stability, and a switch assembly for cutting off the flow of electricity to the heating assembly under predetermined conditions. Further, it would be advantageous to provide an electric chafer heater which provides an indication when the heating surface reaches a predetermined temperature.

SUMMARY OF THE INVENTION

One embodiment of the present invention provides an electric chafer heater for a chafer which includes a chafing dish and a shelf disposed below the chafing dish. The chafer heater includes a base, a resilient member extending upward from the base, an input device, and an electric heating assembly coupled to the input device and to the resilient member opposite the base. The heating assembly has a heating surface positionable at a distance above the base depending upon the compression of the resilient member, wherein the heating surface is biased against the chafing dish by the resilient member when the base is supported by the shelf. The heating assembly has variable power settings selected by the input device.

Another embodiment of the invention provides an electric chafer heater for a chafer which includes a chafing dish and a shelf disposed below the chafing dish. The shelf has an aperture for receiving a standard can heater. The chafer heater includes a base having a cylindrical bottom portion with a diameter approximately equal to the diameter of a standard can heater, whereby the base is removably held within the aperture, a resilient member extending upward from the base, and an electric heating assembly coupled to the resilient member opposite the base. The heating assembly has a heating surface positionable at a distance above the base depending upon the compression of the resilient member, and the heating surface is biased against the chafing dish by the resilient member when the base is supported by the shelf.

Another embodiment of the invention provides an apparatus for warming a food or beverage which includes a chafer including a chafing dish for containing the food or beverage to be warmed and a shelf disposed below the chafing dish, and an electric chafer heater removably supported by the shelf. The electric chafer heater includes a base having a bottom portion and a ballast associated with the bottom portion, a resilient member extending upward from the base, and an electric heating assembly coupled to the resilient member opposite the base. The heating assembly has a heating surface positionable at a distance above the base depending upon the compression of the resilient member. The heating surface is biased against the chafing dish by the resilient member when the base is supported by the shelf.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a perspective view of a chafer including a chafing dish supported above a shelf by a leg assembly, and two electric chafer heaters supported by the shelf;

FIG. 2 is a side elevational view of the electric chafer heater of FIG. 1;

FIG. 3 is a partial cross-sectional view of the electric chafer heater of FIG. 1 taken from the rear;

FIG. 4 is a side cross-sectional view of the electric chafer heater of FIG. 1;

FIG. 5 is a top view of the electric chafer heater of FIG. 1;

DETAILED DESCRIPTION OF THE PREFERRED EMBODIMENTS

Figure 6:
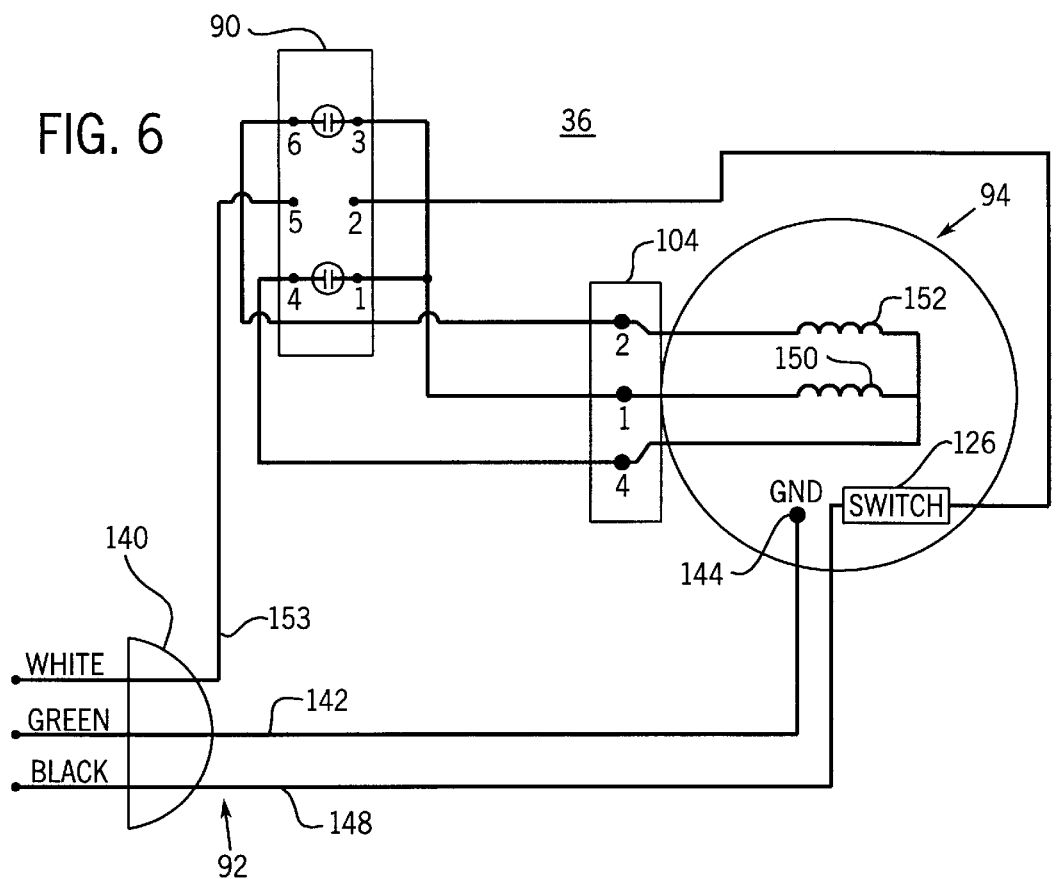
FIG. 6 is a schematic diagram of the electric chafer heater of FIG. 1 with a lighted switch.

Referring to FIG. 1, a chafer 10 includes a chafing dish 12 supported above a shelf 14 by a leg assembly 16. Chafing dish 12 includes a container 18 such as a pan or tray containing the food or beverage to be warmed, and a cover 20. A flange 22 on container 18 forms a removable seal with a flange 24 on cover 20. A handle 26 attached to cover 20 is used to lift cover 20 on and off container 18. Chafer 10 is typically made of a non-corrosive, food-grade stainless steel.

Shelf 14 includes two apertures 28 and 30 sized for receiving standard can heaters. Apertures 28 and 30 are circular holes with a diameter of approximately 3.5 inch. However, in other chafers, the apertures are recesses formed within shelf 14 and sized to receive can heaters. In yet other chafers, shelf 14 has a flat surface for supporting can heaters with flat bottom surfaces. Shelf 14 may support one, two or more chafer heaters depending upon the capacity and style of chafer 10. Shelf 14 is supported by leg assembly 16 above the surface on which chafer 10 rests. Leg assembly 16 includes a frame 32 which holds container 18 above shelf 14, and handles 34 on the sides of frame 32 are provided to lift chafer 10.

Electric chafer heaters 36 and 38 slip-fit within apertures 28 and 30, respectively, and are thus supported by shelf 14. Heating surfaces on top of heaters 36 and 38 are biased against the bottom surface of chafing dish 12 to form a thermal path between the chafer heaters and container 18. During operation, chafer heaters 36 and 38 convert electricity from a power source (e.g., electrical outlet) into heat energy which travels across the thermal path to warm the food or beverages within container 18. When power is turned or cut off, chafer heaters 36 and 38 cool as heat flows into container 18 which acts as a heat sink. Chafer heaters 36 and 38 are the same and the rest of this description references only chafer heater 36.

The chafer shown in FIG. 1 and described above is for exemplary purposes only. Chafers in different sizes, types and varieties are in wide use. Chafing dishes can include rectangular or circular containers, pans, trays, urns, etc., with different capacities. Shelves can have one or more apertures (holes or recesses) for receiving one or more can heaters, or may have flat surfaces for supporting one or more chafer heaters. Leg assemblies may include different numbers of legs, and side walls may also be used to support chafing dishes.

Referring to FIGS. 2–5, chafer heater 36 includes a base or main body 50 with a bottom portion 52, a middle portion 54 and a switch box or handle portion 56. A non-corrosive food-grade stainless steel (e.g., 304 stainless steel) is used for portions 52–56. Preferably, portions 52 and 54 are 20 gauge steel and portion 56 is 18 gauge.

Bottom portion 52 has a cylindrical side surface 58 extending from a flat bottom surface 60. The diameter of bottom portion 52 substantially equals that of a standard can heater such that chafer heater 36 can be received within an aperture sized for a standard can heater. The diameter may be slightly less than that of a standard can heater to insure chafer heater 36 can slip-fit within the apertures of a high percentage of chafers made by various manufacturers. The diameter is approximately 3.5 inches, and preferably 3.56 inches. Bottom surface 60 is flat so heater 36 can be supported by chafers with flat shelves.

Secured within bottom portion 52 adjacent to bottom surface 60 is a cylindrical ballast 62 made of a high-density material such as steel, cast iron or non-ferrous alloys (e.g., Zn-Al sand casting). The weight of ballast 62 lowers the center of gravity of heater 36 for increased stability, thereby maintaining heater 36 in a position to efficiently apply heat to dish 18. Ballast 62 is secured to surface 60 by a nut 64 threaded to a stud 66 welded to surface 60. Nut 64 extends into a recess 68 within ballast 62.

Side surface 58 includes a curved surface 70 which extends outwardly toward a cylindrical flange 72. Curved surface 70 makes contact with the edges of aperture 28 or 30 when chafer heater 36 is lowered into shelf 14. The contact helps hold chafer heater 36 in place and provides a tight slip-fit for apertures with different diameters. Thus, variances or tolerances in the diameter of aperture 28 or 30 are accommodated. Curved surface 70 includes a generally horizontal portion 74 extending above shelf 14 beyond the tangent (i.e., point of contact) when chafer heater 36 is fit within aperture 28 or 30. The vertical distance between bottom surface 60 and horizontal portion 74 is about 1.52 inches. Vent holes 76 formed in the perimeter of horizontal portion 74 provide a cooling flow of air to an interior chamber 78 within chafer heater 36.

Middle portion 54 is secured above bottom portion 52 by fasteners 80 extending through holes aligned through middle portion 54 and flange 72. Preferably, fasteners 80 are rivets such that chafer heater 36 is tamper-proof. However, other fasteners (e.g., screws) could be used, or portions 52 and 54 could be welded together. Portions 52 and 54 could also be formed from a single piece of steel. Middle portion 54 has a cylindrical shape, a preferred diameter of 4.63 inches, and a preferred height of 2.40 inches. Thus, the diameter of middle portion 54 exceeds the diameter of bottom portion 52.

Handle portion 56 is attached to middle portion 54 as shown in FIG. 4. Handle portion 56 is rectangular, and is used to lift chafer heater 36. Handle portion 56 has a bottom surface 82, top surface 84, side surfaces 86, and a front surface 88 for mounting a three-position power switch 90. An electrical power cord 92 with strain relief 91 passes through a bushing 96 in front surface 88. Each conductor 93 of cord 92 may pass through a connector (e.g., a wirenut or double-crimp connector) located in handle portion 56. Shrink tubing 97 passes between portions 54 and 56.

Switch 90 has multiple positions for selecting one of several power settings for chafer heater 36. Switch 90 preferably includes a two-pole, three-position lighted paddle switch (e.g., Carling model LTGQC501-PBBRXVR1). A paddle 93 moves between positions including a central off position ("OFF" in FIG. 3), a low-power position ("LO") and a high-power position ("HI"). Switch 90 includes a lamp for lighting both sides of the switch during high-power operation, and one side of the switch during low-power operation. Alternatively, other switches may be used, such as unlighted switches (e.g., Eaton model P2604-11E double-pole, double-throw, center-off switch) and rocker switches (e.g., Carling V-series switch). Further, other types of input devices may be used to control the variable power settings of chafer heater 36. For example, an infinitely-variable control device similar to a dimmer switch could be used to generate a control voltage as a percentage of an input voltage, or a thermostatic temperature control device with a built-in temperature sensor could be used. Either type of device could include a rotary or slider control.

An electric heating assembly 94 is mounted to the top of a cylindrical heater ring 96 vertically moveable through an aperture 98 in a top surface 100 of base 50. Heating assembly 94 preferably includes a dual power-setting, resistive heating element sealed within a cast heating element block 102 for protection against water, dirt, etc. Heating assembly 94 also includes a terminal block 104 for attaching electric power lines to block 102 and a heating surface 106 for transferring heat energy to chafing dish 12. Heating assembly 94 preferably includes a cast-in heating element such as a Viertakt-Kochplatte 80 model 1208353015 sealed hot-plate made by EGO Elektro-Geratebau GmBH of Germany.

Heating assembly 94 fits within the interior of heater ring 96 until a perimeter 108 of heating assembly 94 contacts an upper rim 110 of heater ring 96. Heater assembly 94 is then held within heater ring 96 by a nut 112 coupled to a post 114 extending from heating assembly 94 through an aperture in a top surface 116 of a heater bracket 118 located within base 50. Heater bracket 118 is secured against movement relative to heater ring 96. Thus, nut 112 and post 114 secures heating assembly 94, heater ring 96, and heater bracket 118 together.

Heater ring 96 and heater bracket 118 are moveable vertically within base 50 depending upon the compression stroke C of a resilient member such as a spring 120. A bottom portion of spring 120 is coupled to ballast 62. A top portion of spring 120 is coupled to members 124 of bracket 118 (FIG. 4). When heater 36 is not installed in a chafer, spring 120 exerts an upward force to bias top surface 116 of heater bracket 118 against top surface 100 of base 50, thereby positioning heating surface 106 of heating assembly 94 at a maximum upward position as shown in FIGS. 2–4.

When heater 36 is installed in chafer 10, however, chafing dish 12 exerts a downward force (labeled "F") on heating surface 106. Downward force F causes spring 120 to compress as heater ring 96 and heating bracket 118 are moved downwardly into interior chamber 78. Increases in force cause further compression of spring 120 and further downward movement of heating surface 106 until a stop 124 formed in bracket 118 contacts surface 70 of base 50.

Preferably, the range of movement C allowed by stop 124 and, thus, the maximum compression stroke C of spring 120, is 1.0 inch. The height of heater 36 between bottom surface 60 and heating surface 106 is adjustable between minimum and maximum values differing by 1.0 inch. The minimum and maximum heights are selected such that, when heater 36 is installed, heating surface 106 is biased against the bottom surface of chafing dish 12 for chafers made by many manufacturers. With preferred heights of 1.52 inch for bottom portion 52 and 2.40 inch for middle portion 54, and a maximum height of 1.31 inch between heating surface 106 and base top surface 100, the height of heater 36 is adjustable between 4.23 and 5.23 inches.

Preferably, spring 120 is a compression spring made of galvanized music wire with a diameter of approximately 2.06 inches and a length of 3.8 inches. The wire has a preferred diameter of 0.07 inches, and the wire makes approximately 3 active turns and approximately 5 total turns. Alternatively, spring 120 is another resilient member such as a leaf spring or another type of coil spring. The resilient member may be made of other materials capable of withstanding the heat within body 50 (e.g., a high-temperature plastic).

A switch assembly 126 is configured to cut off the flow of electricity to heating assembly 94 in response to a sensed parameter. In one embodiment, switch assembly 126 is a high-temperature monitor which cuts off the flow of electricity when the ambient air temperature within body 50 exceeds a predetermined value. Switch assembly 126 preferably includes a Thermodisc 36T21 high-temperature thermostat mounted to heater bracket 118 by fasteners or rivets 128. The thermostat cuts off the electricity flow when ambient air temperature exceeds 175 °C., and restores the electricity flow when the temperature drops below 175° C. However, other types of temperature switches, cut-off temperatures, and monitoring locations can be used.

Switch assembly 126 may also include an inclination switch for monitoring the inclination of chafer heater 36 and cutting off the flow of electricity when the angle exceeds a predetermined value. For example, switch assembly 126 may include a CMI535-75 mercury inclination switch from Comus to switch off the flow of electricity when the angle of inclination exceeds about 35 degrees.

Chafer heater 36 may also include a heat indicator 130 thermally coupled to heating surface 106 to provide a visual indication that the heating surface has reached a predetermined temperature (e.g., above 120° C.). Such an indication can be used to determine when heater 36 is ready for heating. Indicator 130 includes a thermometer mounted at heating surface 106 or at a location thermally coupled thereto. For example, indicator 130 can include a commercially-available liquid crystal-type strip thermometer or a thermometer with a thermally-responsive chemical which becomes transparent to reveal a label when surface 106 exceeds the predetermined temperature. A strip thermometer could be recessed in a side surface of heater ring 96 such that the heater ring can move freely. A strip thermometer and its location on body 50 or heater ring 96 may be selected using known (e.g., predicted or empirically-determined) thermal relationships between heating surface 106 and the selected location. Indicator 130 could, alternatively, include a temperature-sensitive paint applied to heating surface 106. The paint would be selected to change color based upon temperature.

Further, heat indicator 130 could include a timing circuit which drives a lamp for a predetermined time period after power is removed from heating assembly 94. The period would be selected to give heating surface 106 sufficient time to cool, and would take into account the possibility that chafing dish 12 (which acts as a heat sink) may be removed before cooling. For example, a 20 minute period may be selected even though heater 36 may cool to a predetermined level after only 12 minutes when the heater remains thermally coupled to chafing dish 12. A power storage circuit (e.g., capacitor circuit) may be used to supply power for the lamp since line power may be disconnected before heating surface 106 has cooled to the predetermined temperature.

Referring to FIG. 6, electrical power is provided to heater 36 through a three-conductor connector 140 at the end of power cord 92 (e.g., 18/3 SJTO cord). Ground wire 142 is connected to a ground terminal 144 on heating assembly 94 (via a connector 146 attached by nut 112 onto post 114 in FIG. 4), power wire 148 (e.g., 120 $V_{AC}$) is connected to switch assembly 126, and return wire 153 is connected to switch 90 as shown.

FIG. 6 shows switch 90 in the off position. In this configuration, voltage on line 148 passes through switch assembly 126 but does not reach heating assembly 94. Thus, no heat is generated. When switch 90 is in the low-power position, pin 2 is connected to pin 3, and pin 5 is connected to pin 6. In this configuration, voltage on line 148 travels to switch assembly 126, pins 2 and 3 of switch 90, terminal 1 of block 104, heating coils 150 and 152 of heating assembly 94, terminal 2 of block 104, pins 6 and 5 of switch 90, and return wire 153. Thus, heating assembly 94 operates in a low power setting (e.g., 160 W) since heating coils 150 and 152 are energized in series. When switch 90 is in the high-power position, pin 1 is connected to pin 2, and pin 4 is connected to pin 5. In this configuration, voltage on line 148 travels to switch assembly 126, pins 2 and 1 of switch 90, terminal 1 of block 104, heating coil 150, terminal 4 of block 104, pins 4 and 5 of switch 90, and return wire 153. Heating assembly 94 operates at high power (e.g., 275 W) since only coil 150 is energized.

The temperature at which the food or beverage is warmed can be controlled by adjusting the power setting of chafer heater 36. For example, the low power setting may be used to avoid overheating coffee in a coffee urn. The constant application of heat energy to chafing dish 12 provides a steady heat source. In both low and high power settings, the flow of electricity is cut off from heating coils 150 and 152 when switch 126 opens due to a high temperature or high angle of inclination condition.

Figure 7:
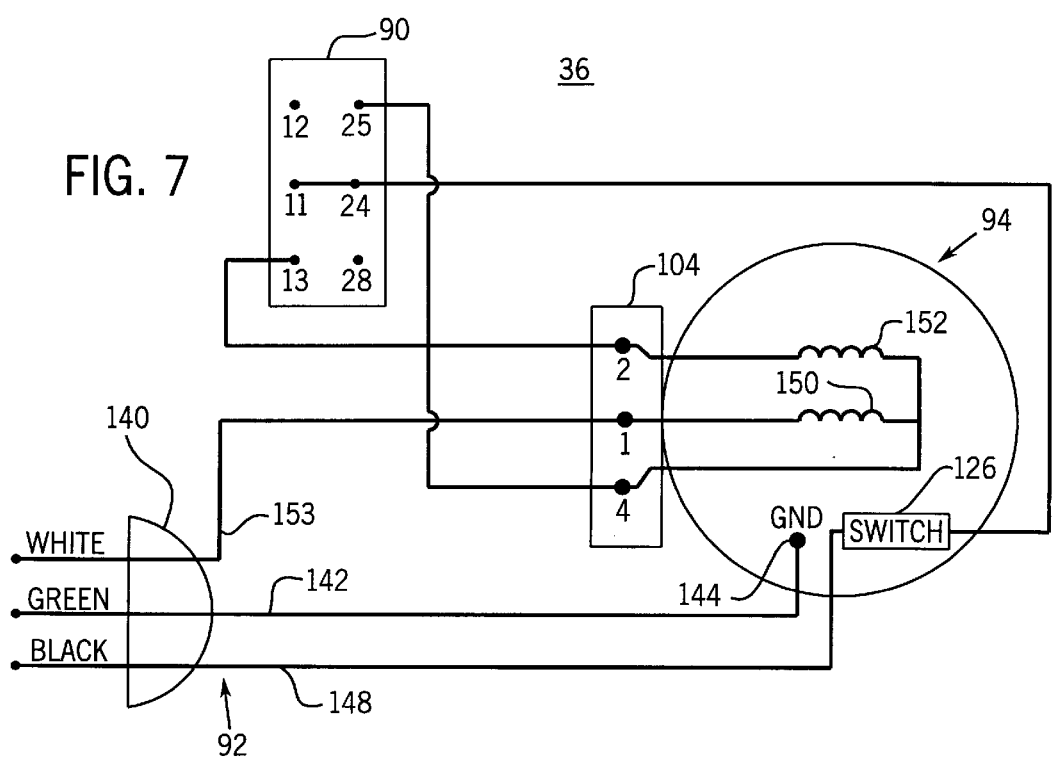
FIG. 7 is a schematic diagram of the electric chafer heater of FIG. 1 with an unlighted switch.

FIG. 7 also shows switch 90 in the off position. In this configuration, voltage on line 148 passes through switch assembly 126 but does not reach heating assembly 94. Thus, no heat is generated. When switch 90 is in the low-power position, pin 11 is connected to pin 13. In this configuration, voltage on line 148 travels to switch assembly 126, pins 11 and 13 of switch 90, terminal 2 of block 104, heating coils 152 and 150 of heating assembly 94, terminal 1 of block 104, and return wire 153. Thus, heating assembly 94 operates in a low power setting (e.g., 160 W) since heating coils 150 and 152 are energized in series. When switch 90 is in the high-power position, pin 24 is connected to pin 25. In this configuration, voltage on line 148 travels to switch assembly 126, pins 24 and 25 of switch 90, terminal 4 of block 104, heating coil 150, terminal 1 of block 104, and return wire 153. Heating assembly 94 operates at high power (e.g. 275 W) since only coil 150 is energized.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. An electric chafer heater for a chafer which includes a chafing dish and a shelf disposed below the chafing dish, comprising:

a base;

a resilient member extending upward from the base;

an input device including a switch having discrete first and second operating power level positions; and an electric heating assembly coupled to the input device and to the resilient member opposite the base, the heating assembly having a heating surface positionable at a distance above the base depending upon the compression of the resilient member, wherein the heating surface is biased against the chafing dish by resilient member when the base is supported by the shelf, and wherein the heating assembly has discrete first and second power settings selected by the discrete first and second operating power level positions, respectively, of the switch.

2. The electric chafer heater of claim 1 further including a lamp assembly for indicating when the heating assembly is in the first or the second power setting.

3. The electric chafer heater of claim 1 further comprising a switch assembly configured to cut off the flow of electricity to the heating assembly in response to a sensed parameter.

4. The electric chafer heater of claim 3 wherein the switch assembly includes an inclination switch to cut off the flow of electricity when the chafer heater inclines by more than a predetermined angle.

5. The electric chafer heater of claim 3 wherein the switch assembly includes a temperature-controlled switch to cut off the flow of electricity when a sensed temperature exceeds a predetermined value.

6. The electric chafer heater of claim 1 further comprising a heat indicator having a thermal relationship with the heating surface, wherein the heat indicator provides a visual indication when the temperature of the heating surface exceeds a predetermined value.

7. An electric chafer heater for a chafer which includes a chafing dish and a shelf disposed below the chafing dish, the shelf having an aperture for receiving a standard can heater, comprising:

a base having a cylindrical bottom portion with a diameter approximately equal to the diameter of a standard can heater, whereby the base is removably held within the aperture;

a resilient member extending upward from the base; and an electric heating assembly coupled to the resilient member opposite the base, the heating assembly having a solid and circular heating surface positionable at a distance above the base depending upon the compression of the resilient member, wherein the heating surface is biased against the chafing dish by the resilient member when the base is supported by the shelf, and wherein the heating surface has a diameter approximately equal to the diameter of a standard can heater.

8. The electric chafer heater of claim 7 wherein the base further includes a cylindrical middle portion secured above the bottom portion and having a diameter greater than the diameter of the bottom portion, whereby the middle portion extends over the edges of the aperture when the base is supported by the shelf.

9. The electric chafer heater of claim 8 wherein the base further has a curved surface extending between the bottom portion and the middle portion, the curved surface configured to make contact with the edges of the apertures when the base is supported by the shelf.

10. The electric chafer heater of claim 8 further comprising a handle coupled to the middle portion of the base for removing the electric chafer heater from the aperture.

11. The electric chafer heater of claim 10, wherein an input device and a power cord are mounted on a front surface of the handle.

12. The electric chafer heater of claim 7 wherein the resilient member includes a spring with a compression stroke of about 1.0 inches, and the distance between the heating surface and a bottom surface of the base ranges between about 4.2 and 5.2 inches.

13. The electric chafer heater of claim 7 further comprising an input device coupled to the heating assembly, wherein the heating assembly has variable power settings selected by the input device.

14. The electric chafer heater of claim 7 further comprising a switch assembly configured to cut off the flow of electricity to the heating assembly in response to a sensed parameter.

15. The electric chafer heater of claim 7 further comprising a heat indicator having a thermal relationship with the heating surface, wherein the heat indicator provides a visual indication when the temperature of the heating surface exceeds a predetermined value.

16. An apparatus for warming a food or beverage, comprising:

a chafer including a chafing dish for containing the food or beverage to be warmed, and a shelf disposed below the chafing dish, the shelf having an aperture for receiving a standard can heater; and an electric chafer heater removably supported by the shelf, the electric chafer heater including a base having a cylindrical bottom portion removably held within the aperture and a ballast associated with the bottom portion, a resilient member extending upward from the base, and an electric heating assembly coupled to the resilient member opposite the base, the heating assembly having a heating surface positionable at a distance above the base depending upon the compression of the resilient member, wherein the heating surface is biased against the chafing dish by the resilient member when the base is supported by the shelf.

17. The apparatus of claim 16 wherein the ballast includes a mass of metal secured within the bottom portion of the base.

18. The apparatus of claim 16 wherein the electric chafer heater further includes an input device coupled to the heating assembly, and the heating assembly has variable power settings selected by the input device.

19. The apparatus of claim 16 wherein the electric chafer heater further includes a switch assembly configured to cut off the flow of electricity to the heating assembly in response to a sensed parameter.

* * * * *

UNITED STATES PATENT AND TRADEMARK OFFICE
CERTIFICATE OF CORRECTION

PATENT NO. : 5,977,521
DATED : November 2, 1999
INVENTOR(S) : Anil N. Mehta; Ralph M. Francis, Jr.

It is certified that error appears in the above-identified patent and that said Letters Patent is hereby corrected as shown below:

In claim 1, column 8, line 17, insert --the-- after "by".

In claim 1, column 8, line 20, insert --operating-- after "second".

Signed and Sealed this

Sixteenth Day of May, 2000

Attest:

Q. TODD DICKINSON

*Attesting Officer*      *Director of Patents and Trademarks*